United States Patent [19]
Hutchinson et al.

[11] 3,741,700
[45] June 26, 1973

[54] TIME MONITORED INJECTION MOLDING CYCLE WITH TIMED PRESSURE CONTROL

[75] Inventors: Herman R. Hutchinson, Wyncote; Vasken F. Arpajian, Huntingdon Valley; Robert S. Malcomson, Lansdale, all of Pa.

[73] Assignee: Pennwalt Corporation, Philadelphia, Pa.

[22] Filed: Mar. 1, 1971

[21] Appl. No.: 119,975

Related U.S. Application Data

[63] Continuation-in-part of Ser. No. 18,142, March 10, 1970, Pat. No. 3,642,402, and a continuation-in-part of Ser. No. 59,499, July 30, 1970, Pat. No. 3,695,800.

[52] U.S. Cl. ............................ 425/159, 425/149
[51] Int. Cl. ................................. B28b 17/00
[58] Field of Search ............. 425/135, 145, 146, 425/149, 159

[56] References Cited
UNITED STATES PATENTS 3,330,003   7/1967   Uggenberger et al. ............. 425/159
3,628,901   12/1971  Paulson ............................. 425/149

*Primary Examiner*—H. A. Kilby, Jr.
*Attorney*—Carl A. Hechmer, Jr. and Stanley Bilker

[57] ABSTRACT

Injection molding process control in which the viscosity index of a shot being injected is measured by timing the advancement of the ram, preferably at constant hydraulic pressure, from the moment of opening of the relief valve to a predetermined ram position before the molds are filled. Variations from a normal interval empirically determined to produce good parts are compensated in the same shot being injected by automatically increasing or decreasing the length of time of imposition of primary high pressure through an electronic clock and then reducing the pressure level for the duration of the injection stroke.

11 Claims, 6 Drawing Figures

3,741,700

INVENTORS
HERMAN R. HUTCHINSON
VASKEN F. ARPAJIAN
ROBERT S. MALCOMSON
BY
*Stanley Belker*
ATTORNEY

TIME MONITORED INJECTION MOLDING CYCLE WITH TIMED PRESSURE CONTROL

This application is a continuation-in-part of our prior U.S. patent applications, Ser. No. 18,142, filed Mar. 10, 1970, now U.S. Pat. No. 3,642,402 and Ser. No. 59,499, filed July 30, 1970 now U.S. Pat. No. 3,695,800.

This invention relates to injection molding machines and more particularly relates to a process control system for producing injection molded plastic parts of uniform high quality on such machines.

In prior U.S. Pat. No. 3,642,402, we disclosed a process control system in which the viscosity characteristics of the platicized material in the shot being injected were monitored as a function of the melt stream pressure at a predetermined position of the ram forward stroke during flow of the material into the mold. If the measured melt pressure termed "control pressure" varied from predetermined band limits set for producing satisfactory parts, the heat input to subsequent shots being prepared was correspondingly varied (1) by modifying the temperature of the extrusion barrel, (2) by changing the speed of screw rotation, or (3) by altering the amount of back pressure on the screw during its rotation.

In prior U.S. Pat. No. 3,695,800, the viscosity of the plasticized material being prepared was monitored as a function of ram injection speed by measuring the rate of melt flow at constant hydraulic pressure. The interval was measured during the injection stroke from the time in ram advancement when the pressure relief valve in the hydraulic circuit opened and the time that the mold cavities were substantially filled, i.e. when the ram was essentially at the end of its stroke. When the monitored time interval varied from predermined limits, compensation again was accomplished in subsequent shots (1) by modifying the degree of heat input to the next shots being prepared as set forth in our first application, (2) by varying the length of time of applying primary high pressure before reduction to a secondary lower pressure level, or (3) by varying the degree of primary high pressure applied during the initial portion of the injection stroke.

The control systems of each of the foregoing applications thus compensated for measured variations in viscosity conditions by changing the plasticity of a subsequent shot being prepared or by modifying the conditions of injection in subsequent shots, i.e. varying the primary high pressure or the length of time of its imposition in a following shot. The present invention is related in principle to the concept of revising the duration of the high pressure application time, but accomplishes the correction for variations in viscosity index in the very same injection cycle by adding to or subtracting from the time set on an electronic clock which controls high pressure application in the identical shot before the latter's completion. The principal advantages of controlling each shot as it is being injected is that correction is always being made for the manner in which the various valves shift during the corresponding cycle as well as verification in accuracy of other machine functions including temperature, pressure and humidity fluctuations during that shot. As a result, part weight, and hence quality, may be held with great precision. In addition, by relating apparent viscosity (viscosity index) to injection time in the same cycle, it is possible to make correction for part weight deviations in any injection system in which duration of primary pressure is critical. Furthermore, the constantly correcting timed pressure control is especially efficient for high speed, short cycle high volume production of smaller parts because there is no time lag resulting from carryover to later cycles.

The present invention accordingly contemplates the monitoring of the viscosity related time interval such that the measurement is completed prior to the cessation of primary injection pressure and the latter is timed to terminate before the end of the injection stroke (when the molds are filled). The viscosity related time interval is preferably measured from the moment of opening of the hydraulic circuit pressure relief valve to a point in time in advance of filling of the mold whereby the measurement is taken at constant pressure. However, the apparent viscosity might also be measured over a course beginning at the start of the injection stroke and terminating at actuation of the pressure relief valve. Thus, if the measured interval varies from a predetermined normal time band which has been empirically established as producing satisfactory parts, increments of time may be added to or subtracted from an electronic timer which controls the duration of primary injection pressure. In this manner should the viscosity index of the melt during the shot indicate a stiffer or more viscous material, an increment of time is added to the timer so that the primary pressure stroke will be extended and more material will be packed into the mold at the end of the same stroke. Correspondingly, if a less viscous material is indicated, more material will have been crammed into the mold at the beginning portion of the stroke so that time will be subtracted from the electronic timer at the end of the stroke in diminution of primary injection time.

It is therefore an object of this invention to provide an injection molding process control in which compensation is made in the same cycle, for variations in viscosity index monitored at the beginning phase of the injection stroke.

Another object of this invention is to provide a time-based monitoring system for injection molding machines in which the apparent viscosity of the melt is measured as a function of rate of flow at some stage of the injection stroke, and when the flow rate varies from predetermined limits, automatic compensation being accomplished by revising primary injection time in the very same shot being injected.

Still another object of this invention is to provide an injection molding process control in which an operator may set up parameters of this machine cycle in a manner corresponding to conventional machine operation.

Other objects of this invention are to provide an improved device of the character described which is easily and economically produced, sturdy in construction and highly efficient in operation.

With the above and related objects in view, this invention consists of the details of construction and combination of parts as will be more fully understood from the following detailed description when read in conjunction with the following drawings, in which.

Figure 1:
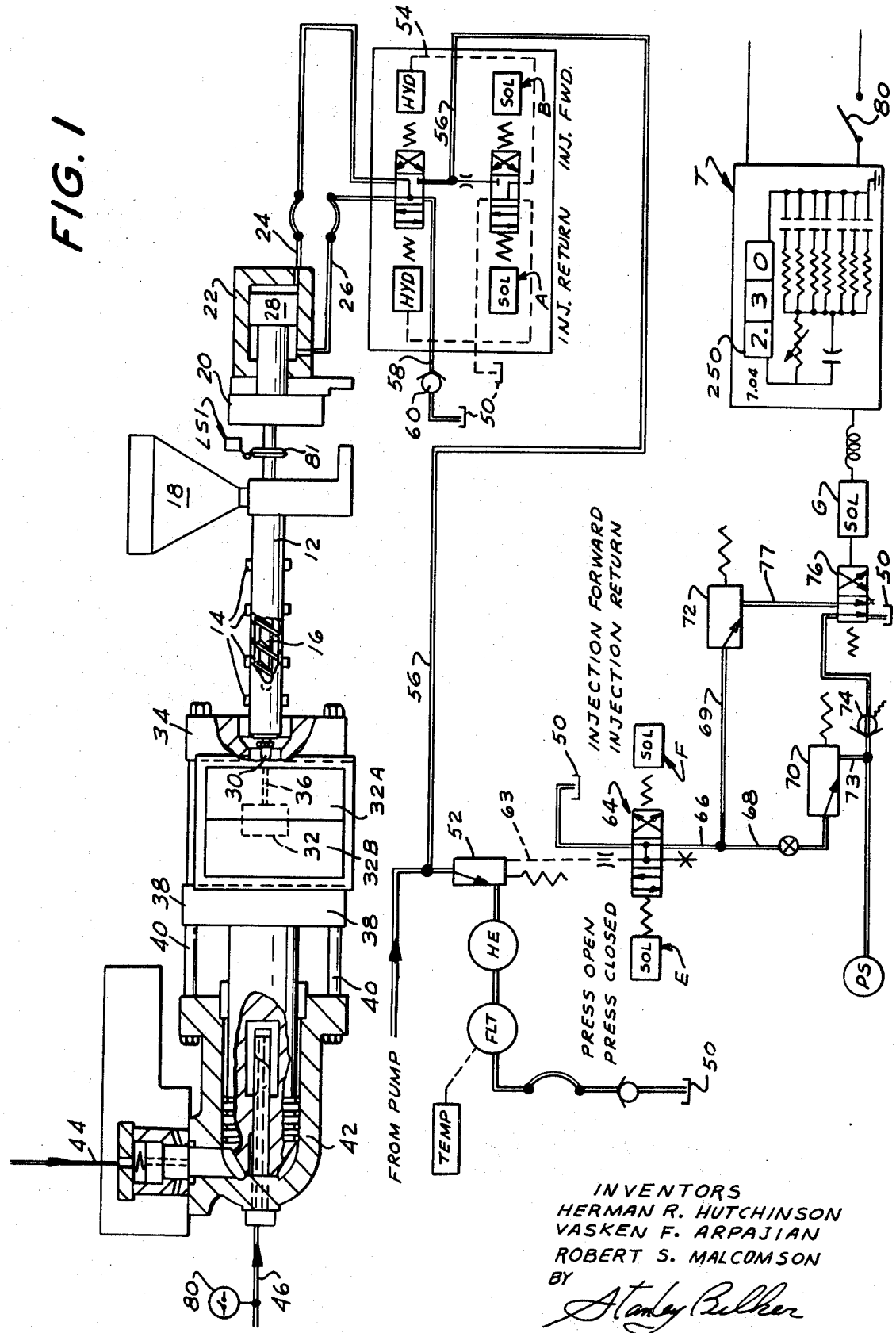
FIG. 1 is a side elevational view, and partly in section, of an injection molding apparatus embodying the present invention, the hydraulic circuitry incident to the time-monitored, timed pressure process control being included.

Referring now in greater detail to the drawings in which similar reference characters refer to similar parts, we show an injection molding process control system in which the viscosity of the plasticized material in the melt stream is monitored by measuring a predetermined portion of the injection stroke. In the basic embodiment, the measurement is made by timing the injection stroke at constant pressure. During the forward portion of the stroke, hydraulic pressure behind the ram builds up to a level which is sufficiently high to insure high speed injection. This is termed primary or high pressure. At this stage a hydraulic pressure relief valve in the circuit becomes actuated so that the rate of flow into the mold becomes pressure limited and is substantially constant thereafter. By measuring the elapsed time between the point at which the relief valve opens to a later portion of the injection stroke, an indicia of the melt viscosity can be obtained. It is also conventional to apply the primary or high hydraulic pressure for as long an interval as possible during ram advancement in order to shorten the injection period and then reduce the pressure to a lower level which is insufficient to flash the molds. In the present invention, the duration of the primary or high pressure interval is governed by an electronic clock which is empirically set to time out at an interval producing satisfactory molded parts. The time out period is subsequent to the end of the monitoring period but prior to the end of the injection stroke, including a band which will allow several increments (in this case, four increments on each side of a midpoint) of time to be added to or subtracted from the electronic clock in order to compensate for variations in melt viscosity. Thus, variations from a prescribed monitored band will be compensated for in the same shot by automatically adding or subtracting an increment of time on the electronic clock at the end of the high pressure portion of the stroke. The increments are established empirically at the beginning of a run of a given plastic material during initial set-up.

Referring now to FIG. 1, the injection molding apparatus itself is generally conventional and includes an extrusion cylinder or barrel 12 which is heated by a number of electrical elements 14. A screw 16 axially supported in the barrel 12 is both rotatable and longitudinally reciprocable therein. Plastic material is fed into the barrel 12 from a hopper 18. Rotary motion for the screw 16 acts to plasticize the material and is accomplished by means of a suitable motor drive unit 20. A hydraulic cylinder 22 connected to oil lines 24 and 26 operates to drive piston 28 in either forward or reverse directions for injection of the prepared shot through nozzle 30 into the mold 32. As illustrated, the right hand portion 32A of the mold is mounted upon a stationary platen 34 and includes a sprue 36 which channels the plastic from the nozzle orifice into the mold cavity. The left hand portion 32B of the mold is affixed to a moving platen 38 which is horizontally reciprocable on tie rods 40. Opening and closing of the mold is effected by way of clamping cylinder 42 operative by way of suitable oil lines 44 and 46 connected to the hydraulic pumping system.

The hydraulic system for controlling the piston 28 operative within cylinder 22 (and clamping cylinder 42 as well) includes a motor driven pump (not shown) whose intake side is connected to a tank or reservoir 50 and a pressure regulating valve 52 associated therewith for maintaining a predetermined pressure in lines 24 and 26. A conventional four-way hydraulic reversing valve 54 is interposed to direct fluid under pressure from line 56 through either line 24 or line 26 to actuate the injection piston 28 in the desired direction and to return the fluid displaced by movement of the piston through the other of the lines, through the valve 54 itself and back to the tank 50 via line 58 and check valve 60. The directional disposition of the "forward-return" four-way control valve 54 is controlled either automatically or manually by push buttons (not shown) on the control panel to actuate solenoid A or solenoid B within the valve itself.

The pressure control valve 52 is nominally set at 2,000 psi, for example, and a small portion of the hydraulic flow is permitted to pass and bleed through control line 63 with four-way valve 64 in either "neutral" or in "left" position. With the four-way injection control valve 54 in "forward" position, solenoid F moves the position of the valve 64 to the left so that control line 63 is in communication with line 66. Line 66 branches to a primary remote control line 68 and to a secondary pressure remote control line 69, both of which lead to the control or instrument panel (not shown). The primary control line 68 directs control fluid to a remote pressure relief valve 70 which is also mounted on the instrument panel and nominally adjustably set to the primary or high pressure, for example 1,200 psi. The drain from primary injection pressure control valve 70 is directed back to the sump 50 by way of drain line 73, check valve 74 and Hi-Low valve 76, when the latter is in the position shown. A pressure actuated switch PS is adapted to trigger an electrical signal when a predetermined control pressure set at valve 70 has been attained. This starts the monitored time interval when constant injection pressure begins. Correspondingly, the drain from secondary injection pressure remote control valve 72 is directed through line 77 which is normally blocked by valve 76 until Hi-Low solenoid G is actuated. Solenoid G is energized after a predetermined set time which has run on an R-C electronic timer T which is itself triggered in one embodiment by closure of a switch 80 at the start of the injection stroke. In the first embodiment, switch 80 is a pressure actuated switch located in the press hydraulic clamping circuit and adapted to be closed when full hydraulic pressure has been applied to the clamping cylinder 42. The main relief valve 52 is thus controlled to lower values by remote relief valves 70 and 72.

The time interval monitored by the instant invention begins at a precise moment in time during the forward injection stroke of the piston 28 and ram 16 when the control hydraulic pressure reaches a predetermined value. This value is determined by the control pressure which is set on the primary remote control relief valve 70 for the particular plastic material being run, and the trigger for the start of the time period occurs when the pressure switch PS is tripped to produce an electrical signal. The end of the time period is determined when limit switch LS1 has been tripped by ring 81 mounted on the ram shaft to produce an electrical signal. This position is prior in time to the setting of the electronic clock T which controls the ram stroke at high pressure. A time band is established within which the particular material can be molded into satisfactory parts, and this band is a measure of suitable viscosity. If the melt is too viscous, a correspondingly greater time is expended in ram movement from the point at which the relief valve 70 opens to the point at which tripping of limit switch LS1 occurs. If the melt is too thin, the period of time for the ram 16 to move from the opening of relief valve 70 to the end of the injection stroke is correspondingly shorter. The clocked movement of the ram 16 occurs at constant pressure and is thereby a function of the rate of melt flow at such pressure.

Referring back to the hydraulic diagram of FIG. 1, the pressure relief valve 52 is set at 2,000 psi, for example. During the injection stroke, solenoid B is actuated so that the four-way valve 54 permits the flow of fluid through line 24 into the cylinder 22 and the return fluid in front of the piston 28 back to the tank 50 through check valve 60. Solenoid F is also energized so that oil in the small control line 63 is in communication with line 66. Solenoid G is deenergized at this time so that line 77 from the secondary pressure remote valve 72 is closed by valve 76 so that line 77 cannot see the tank 50 but line 73 can see the tank 50 through check valve 74. Check valve 74 is set at 65 psi, for example, but has a small groove or orifice therein which permits any fluid in line 73 to bleed therethrough. Accordingly, pressure builds up in line 56 moving the piston 28 forwardly and injecting the prepared shot into the mold. Meanwhile, a portion of the oil passes through line 63, through the valve 64 into line 68, through valve 70, bleeds through the orifice in check valve 74, and thence into the sump 50 via its open path through valve 76. Since the pressure on the upstream side of check valve 74 is zero (i.e. in line 73) so long as the fluid merely drips through line 73, the pressure on the remote pressure relief valve 70 gradually builds up until it reaches the pressure value set thereon, for example 1,200 psi. When the pressure reaches the value set, a considerable surge of oil passes through valve 70 (arrow moves to line 73). The pressure switch PS, which was set at 50 psi, now trips its electrical contacts, because the pressure on check valve 74 exceeds its set 65 psi value. Note that the remote secondary valve 72 cannot be actuated in view of the fact that its drain line 77 is closed. However, the 1,200 psi control pressure on primary remote valve 70 now permits the fluid to pass through the main relief valve 52 at the same 1,200 psi pressure. Therefore the pressure on line 56 is held at 1,200 psi until the Hi-Lo solenoid G is actuated when the set time runs out on the R-C high-low pressure timer T. At this stage, valve 76 reverses and couples line 77 to the tank 50 whereupon secondary pressure remote relief valve 72 set at 500 psi for example, opens. Accordingly, the main relief valve 52 passes control fluid at the same 500 psi pressure set on valve 72. Accordingly, the hydraulic pressure on the piston 28 from line 56 drops to 500 psi for the remainder of the injection stroke. It is to be observed that the high volume path of oil through valve 52 passes to the tank 50 through heat exchange HE and filter FLT line whenever the pressure in line 56 reaches the setting of whichever of the pressure control valves 52, 70 or 72 is being signaled to dominate. For example, when the press is opening or closing, at which time solenoid E shifts the valve 64 to the right to block the remote drain line 63 of relief valve 52, the pressure in the system can rise to the full 2,000 psi setting of valve 52. When valve 64 is in center position, as shown with neither solenoid E or F energized, remote control pilot line 63 is vented to tank and valve 52 opens at the minimum pressure, as would be the case as the machine is idling. When solenoid F is energized, remote control pilot line 63 is directed to valves 70 and 72 which in turn remotely control and limit valve 52 to primary and secondary pressures depending on position of solenoid G.

Figure 2:
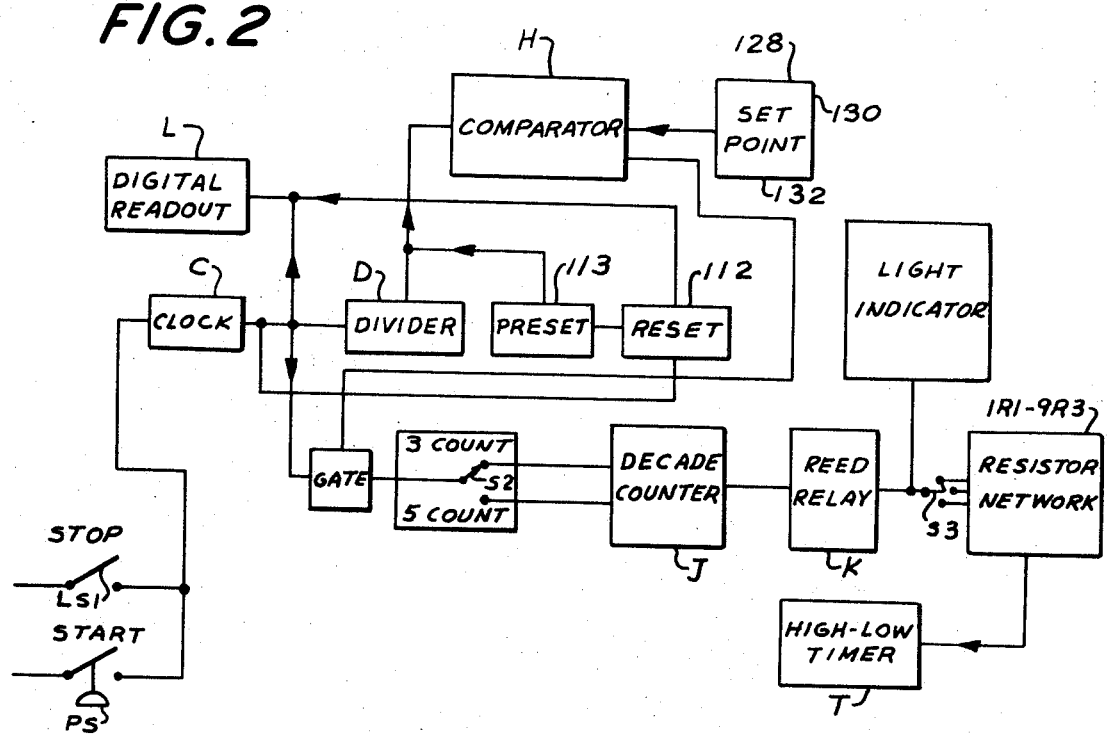
FIG. 2 is a block diagram illustrating the basic components of the electronic control system.

Referring now to FIG. 2, there is shown in block diagram form the basic logic system for electronically measuring the forward motion of the ram 16 at constant pressure. When the rate of melt flow is outside empirically determined limits, increments of time are added to or substracted from the high-low pressure timer T which had been set previously by the operator to a period effective to produce satisfactory parts. The electronic circuitry for accomplishing the measurement is set forth in FIG. 3, the two figures to be read in conjunction with each other for maximum comprehension.

The start of the injection stroke begins when the injection forward contact closes, the press clamp closes and the pressure switch 80 reaches full clamp pressure. The ram 16 moves forward and injects material into the mold 32, and when the hydraulic pressure builds up to a predetermined value, pilot valve 70 opens. When valve 70 opens, constant primary hydraulic pressure (i.e. 1,200 psi) is imposed upon the shot being injected simultaneously, pressure switch PS is actuated to start the viscosity measuring cycle. The end of the measuring cycle is signaled by the closure of limit switch LS1 when contacted by ring 81.

All logic of the electronic circuit is binary in character, the numeral "1" adjacent the corresponding line designating the high state and the numeral "0" designating the low state. A series of integrated circuit logic cards are employed, and in the electrical schematic the symbol "⏵" is used to designate a NAND module and the symbol "⏴" designating an inverter. In the inverter module, the output is logic "1" when the input is logic "0," and the output is logic "0" when the input is logic "1." In the NAND circuit operation, the output is logic "0" only if all inputs are logic "1." When an input is connected to ground, the logic is "0." Inputs which are disconnected (unwired) simulate logic "1" input. In the system employed, ground always takes preference. The first logic numeral adjacent a line shows the initial condition. A logic numeral with a bar thereabove (i.e. "1̄" or "0̄") indicates reset condition, and an underlined logic numeral (i.e. "1" or "0") indicates start. The last logic numeral which neither has a bar above nor below designates the stop condition.

The system control for the starting and stopping the rate-of-flow clock C is an RS flip-flop module comprising two 2-input NAND gates 102 and 104 which are cross coupled to each other. In the initial condition, NAND gate 102 has a set input of logic "1" whereas NAND gate 104 has its lower or "clear" input at logic "1." Accordingly, the output of gate 104 is "1" which is cross coupled back to the "clear" input of gate 102 and places a logic "1" thereon. With the two logic "1" inputs on NAND gate 102, its output is "0" at initial condition.

When the injection forward contact closes and the injection pressure switch PS closes, ground is applied to the upper or "set" input of gate 102 and imposes a logic "0" condition thereon. Therefore, at the start of the measured run, the output of NAND gate 102 switches to a logic "1" or high state. This constant "1" or high signal is applied to the triggering gate of a one shot multivibrator 106 which emits a one-half (0.5) millisecond pulse going from "0" to "1" to "0." Similarly, the "0" from the output of NAND gate 104 is applied to inverter 107 which inverts the constant "low" and applies a constant "1" to one shot multivibrator 108. However, the latter signal is subjected to a few microseconds delay in passing through the inverter 107, and hence multivibrator 108 is not turned on until after the 106 one shot has been triggered. When the output pulse from one shot multivibrator 106 goes back to "0" (0.5 millisecond after it has been emitted), it is applied to the upper gate of one shot 108. The upper input gates of both 106 and 108 are triggered whenever a high condition changes to a low. Therefore, the output of one shot 108 emits a ½ millisecond pulse going from low to high back to low. When the latter pulse changes to low or "0," it triggers 106 agains, this time by way of the upper gate, and causes a second 0.5 millisecond pulse to be emitted 1 millisecond after the first or start pulse had been applied. The second pulse output from 106 again trips the upper gate of one shot multivibrator 108 upon changing from a "high" to a "low" condition whereupon the output pulse retriggers one shot 106 upon returning to the zero condition. Accordingly, the one shot multivibrators 106 and 108 act in combination with each other as an oscillator (clock C) emitting an accurate pulse train at 1,000 cycles per second. These pulses continue until 106 and 108 are turned off when stop position limit switch LS1 is actuated and causes reversal of R-S flip-flop NAND gates 102 and 104.

Thus, a series of pulses at a frequency of 1,000 cycles per second are delivered to the upper input of NAND module 110. The lower input of NAND gate 110 normally has a constant high applied thereto, except when a 0.1 millisecond one shot "reset" multivibrator 112 is triggered. The one shot reset 112 is automatically triggered at the start of each cycle when the NAND gate 104 output goes from "1" to "0." Therefore, while the oscillator C is operative and except for the time of application of the 1/10 millisecond pulse applied during automatic or manual reset, 1,000 cycles per second pulses are delivered from the output of NAND module 110 to the input of a divider D.

The divider D constitutes a four-decade counter in which each module divides the input thereto by 10. Thus, the output of divider module 114 is 1,000/10 or 100ths of a second (0.01 second); the output of module 116 is 100/10 or 10ths of a second (0.1 second); and the output of module 118 is 10/10 or seconds. Each module consists of four cascaded binary decimal triggered flips flops which count in the 1-2-4-8 code; module 114 registering hundreths of a second; module 116 registering tenths of a second; and module 120 registering seconds. The 1, 2 and 4 flip flops in each counter may be preset by applying ground to the appropriate inverted (not) outputs $\bar{1}$, $\bar{2}$ and $\bar{4}$. Counting occurs on the transistion from logic "0" to logic "1" at the input to the least significant decade, in this case the "hundredths" module decade 116. The counting input of each succeeding decade is tied to the $\bar{8}$ (not 8) output of the preceding stage. Reset to "0" is accomplished by making the reset pin a logic "1."

The output of the divider counter D (from decade modules 116, 118 and 120) is fed into one side of a comparator H (4 bit parallel comparator modules 122, 124 and 126). These comparator modules 122, 124 and 126 accept binary decimal inputs and their complements from two sources and detect coincidence between them when the voltages are opposite. Digital set point values are dialed in to the other side of the comparator modules 122, 124 and 126 via corresponding dial modules 128 (hundredths), 130 (tenths) and 132 (seconds). When coincidence is detected, the output becomes a "1."

The output from each of the comparator modules 122, 124 and 126 is applied to a four-input NAND gate 134, whose output is logic "0" only if all inputs are logic "1." The fourth input (lowermost) to NAND gate 134 is applied by 0.1 millisecond one shot strobe multivibrator 136 in order to reduce the likelihood of triggering by fortuitous spikes. The output of the strobe 136 occurs only once every one hundredth of a second since it is fed by the 100 cycle per second pulses coming out of the divider module 114 by way of an intermediate 0.1 millisecond one shot multivibrator 138. The one shot 138 acts as a delay circuit and triggers on the leading edge of each pulse of the 100 cycle per second oscillations from the divider decade 114 as each pulse goes from a "low" to a "high." The strobe 136 triggers as the trailing edge of each of the output pulses from the delay one shot 138 goes from a high to a low. Therefore, the NAND gate 134 can only produce a zero output during the precise one thousandths of a second when coincidence occurs. Accordingly, as the NAND gate 134 produces a zero output, a high is produced at the output of RS flip flop 140–142 which holds the logic "1" signal until NAND gate 142 receives a reset pulse.

The stored signal output of the RS flip flop 140–142 (i.e. the comparator coincidence signal) is then applied to one input of two-input NAND 144, to the other input of which is applied the 100 cycle per second output from the divider 114. As soon as the "high" coincidence signal output from the RS flip flop 140–142 is applied, the NAND 144 passes a clock signal of 100 pulses per second. This clock signal is then applied to the clock input universal flip flop module 146. Module 146 operates in conjunction with either universal flip flop 148 or universal flip flop 150 by way of a switch S2 to deliver either a three-count or five-count output. That is each of the universal flip flops 146, 148 and 150 are of the master-slave variety with a clock input controlling the transfer between them. This arrangement results in a D.C. coupled flip flop which operates on a "1" to "0" transistion of the clock input. Information can only be put into the master when the clock is high ("1"). Each of these universal flip flops has two SET gate inputs (upper two leads to the left of the boxes) and two CLEAR gate inputs (lower two leads to the left of the respective boxes). The lower of the two CLEAR inputs is unconnected in each instance so that a logic "1" is always applied to one of the two "CLEARS." If both SET inputs are made logic "1," and the other "CLEAR" is made logic "0," when the clock input is at logic "1," the master flip flop will set. Therefore, when the clock returns to "0," the Q output will become a "1," If both CLEAR inputs are made logic "1" (one already being retained at a high by virtue of being disconnected) and one SET input is made a logic "0," when the clock is a "1," the master flip flop will clear. Therefore, when the clock returns to a "0" the $\overline{Q}$ output will become a "1."

For the present description, it will suffice to indicate that the function of the universal flip flops 146, 148 and 150 is to provide a time band over each of a series of measuring steps. Thus, where the output is taken from universal flip flop 150, which is the position of the count switch S2 shown, the band will be a "5 count" interval — one output clock pulse for each five one hundredths of a second input pulses from the divider 114. If the count switch S2 is moved to the position which is shown in the drawing as presently open, the output is taken from universal flip flop 148 and the band interval will be a "3 count" — one output pulse for each of three one hundredths of a second clock input pulses. Therefore, in "5 count" position the band interval measured on each step will be five hundredths of a second and in "3 count" position, each step interval will be three hundredths of a second. For the purpose of brevity, only the 5 count or five hundredths of a second band will be described, it being understood that the identical principles apply to the 3 count application.

The pulses emitted at 0.05 second intervals from universal flip flop 150 are fed into one input of a 4 input NAND gate 152, one input of which is held at "1" since it is disconnected. The upper and lower inputs to the NAND gate 152 are similarly held at "1" because of their manner of connection to a "TOO SOON" or "TWO FAST" alarm which will stop the count. The output of the NAND gate 152 is fed into a decade counter J which has a decimal converter so as to provide a 10 step output. That is, the decade counter J contains a divide-by-10 counter with decimal decoded outputs, each of which constitutes a NOT AND. The output of the NAND gate (represented by the numerals 1 to 10 (or 0) inclusive to the right of the box) giving the decimal equivalent or step output of the count contained in the counter is at zero volts. All other NAND gate outputs will be at binary "1." The counter J advances when the clock input pulse (from NAND gate 152) goes from "1" to "0." The counter J is also reset on a "1" to "0" transition, and in initial condition at the beginning of the injection cycle step 10 (or 0) is set to "0" while all other steps are placed at "1."

Figure 4:
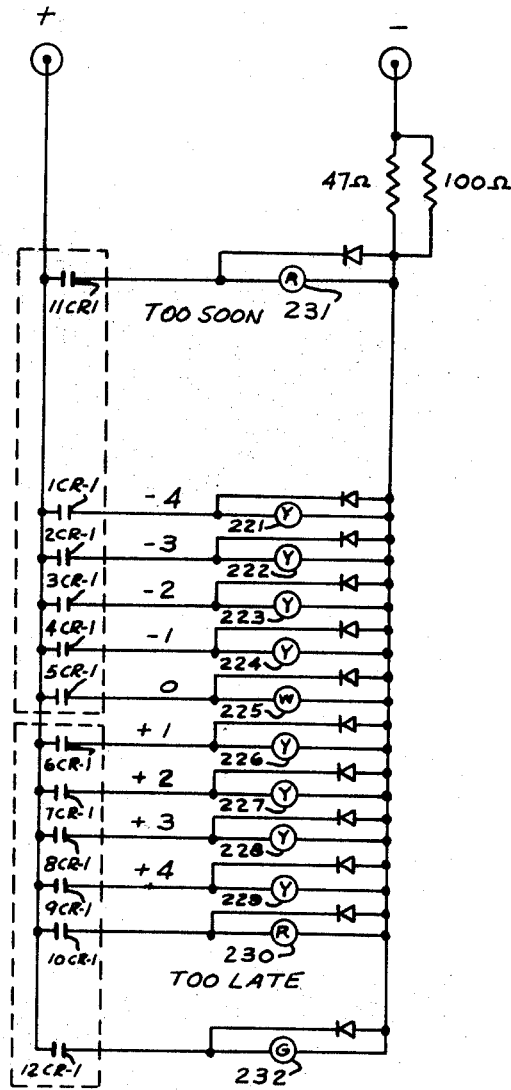
FIG. 4 is an across-the-line schematic diagram of the light indicating control panel.

The NAND output gates of the counter J each feed into a corresponding inverter, the first nine steps of which are directed into a reed relay board K. The reed relay board K includes nine 2-bit NAND gates 201 to 209 inclusive which control respective relays CR1 to CR9 inclusive. The relays themselves are activated by making both NAND gate inputs logic "1"s. That is, the relay which is actuated will have its control NAND output at "0" thereby applying + 7 volts across the relay itself. It is to be observed that the stop signal at the end of the measuring cycle is applied to the lower of the NAND relay control inputs by way of the output from inverters 156 or 158, inverter 160 and the high signal output of the NAND gate 104 in the start-stop RS flip flop. Each of the relays in the reed relay board K has a pair of contacts, one set of contacts being operative to control indicator lamps 221 to 232 inclusive (FIG. 4) while the other set acts to add to or substract resistance (FIG. 5) from the RC time T.

The counter J and the relay board K together with the latter's resistance incorporating and lamp indicating contacts are set up on a plus-and-minus tolerance basis. The mid-point of the scale is selected to be step 5. That is, if the measured run of the injection stroke causes a tripping of step 5 relay CR 5, this would indicate that the viscosity index is within the range of a shot empirically determined to produce satisfactory molded parts. At this portion of the monitored interval, the center lamp 225 (clear) would light to indicate that the measured period would be at the center of the range ±0.02 seconds on the "5 count" or ±0.01 seconds on the "3 count". Actuation of any one of the first four step relays CR1, CR2, CR3 or CR4 would indicate that the viscosity of the shot being injected was too thin since the monitored time interval would be less than that which was empirically determined to produce perfect parts. Actuation of any one of the relays CR6, CR7, CR8 or CR9 would indicate that the shot being injected at that moment was too viscous since the monitored interval from opening of the relief valve 70 to closing of microswitch LS1 was longer than the prescribed band. In any of the foregoing cases, actuation of the too thin relays CR1 to CR4 or the too viscous relays CR6 to CR9, correction would still be within the capability of the present process control system — hence one of the yellow lamps 221 to 224 or 226 to 229 would light, and the appropriate resistance would be incorporated in the R-C timer T whereby the appropriate increments of time would be added or subtracted from the remainder of the high pressure portion of the injection stroke. However, since the correction must be made within the very same injection cycle as the shot being injected, it is necessary to sense the error before the timer T actually times out. Moreover, during those shots in which the viscosity index is determined to be too thin, it is necessary to determine the degree of insufficiency before the "normal" CR5 band zone has even arrived. Therefore, the period of coincidence must be advanced ahead of the set point by an amount of time corresponding to the four steps preceding the midpoint of step 5. This is accomplished by presetting the divider decades 116 and 118.

In the "5 count" position of the count switch S2, the period to be monitored must be advanced by five steps of 0.05 second each. Accordingly for the "five count" measurement, the 100ths decade 116 must be preset to 0.05 (binary "1" plus binary "4") and the 10ths decade 118 must be preset to 0.2 (binary "2"). Therefore, a ground connection is adapted to be applied to the outputs $\overline{1}$ and $\overline{4}$ in the 100ths decade 116 and to output $\overline{2}$ in the 10ths decade 118. The ground is actually made upon triggering of one shot "preset" multivibrator 113 which is triggered by the output of "reset" one shot 112. That is, at "start " the single pulse output from reset multivibrator 112 pulses the preset multivibrator 113 which emits a single pulse going from "0" to "1" to "0." The preset pulse is applied to 2-input NANDS 162, 164 and 166, each of which has a "1" already applied to one of its inputs by being disconnected. It is easily seen that a logic "0" is produced at the outputs of each of the NANDS 162, 164 and 166 when "preset" 113 is triggered. Thus, the decade counters 116 and 118 are preset to 0.25 in "5 count" position and to 0.14 in "3 count" position. It is therefore apparent that the monitored time interval will effect the tripping of comparator H by 25 or 14 seconds before the "midpoint" coincidence set point depending upon whether the switch S2 is in 5 count or 3 count position.

In the event that the monitored time of the shot being injected precedes the midpoint by more than 0.15 second based on 3 count or exceeds the midpoint by 0.25 second based on 5 count, the shot will fall outside specification and would be theoretically incapable of being corrected. Thus, if the shot viscosity were too viscous beyond control of the system, at coincidence, the decade counter J would be tripped beyond step 9 — i.e. step 10 — , thereby applying a "0" to the input of inverter 170 causing a high to be placed on two-input NAND 172 which functions as a stop counter. However, just previously the output of step 9 had been "0" when the ninth step of decade J was actuated. This "low" at step 9 was applied to the upper input of NAND 174 in RS flip flop 175, whereby the output was "1." That is, at the start of the cycle, the "0" to "1" reset pulse applied to the input of 4 input NAND gate 178 imposed a "0" condition upon the lower input of NAND 176 in the RS flip flop. When the reset pulse reverted to "0," the output of NAND 176 became "1." This "1" was applied to the lower gate of NAND 174 at the time step 9 had a "1" because of its being unactuated. Therefore, RS flip flop 175 had a "0" output. Thus, when the output of step 9 changed to "0" as it was actuated, it causes the RS flip flop 175 to toggle to a "1" output. Accordingly, since both inputs to the stop counter NAND 172 are at "1," its output is "0." This is transposed to a "1" by way of inverter 178 and applied to the lower input of NAND 210 in the relay board K, the upper input of which will be at "1" when stop signal at the end of the run is applied through inverters 158 and 160. The "0" output from NAND 210 actuates reed relay CR 10 closing its 10 CR-1 and 10 CR-2 contacts. Tripping the 10 CR-1 contacts causes red indicator lamp 230 to light whereas closing of the 10 CR-2 contacts causes an audible alarm to be sounded, both of which denote in this case a "TOO LATE" monitored cycle. Note also that the "0" output from stop counter NAND 172 is applied back to the lower input of start counter NAND 152 thereby disarming the latter and preventing further counting by the decade counter J. At this stage the operator must attend the machine.

Similarly, if the shot were too thin and beyond capability of machine correction, the stop signal resulting from closure of position switch LS1 would apply a "high" signal on the lower input gate of NAND 180 by way of inverters 160 and 150 while there still was a positive signal on NAND 180's upper input. Note that the second input to NAND 180 is supplied by way of RS flip flop 185 comprising coupled NANDS 182 and 184. Prior to actuation of step 1 in the decade counter, the first step would have an output of "1" which would be transposed to "0" by way of the corresponding inverter in series therewith. This "0" output which is applied to the lower input of NAND 186 produces a "1" at the output thereof. The high output from 186 is applied to the lower gate of RS flip flop NAND 184 whose output is "0"(when the automatic reset pulse from one shot 112 changed from "1" to "0"), the output of the NAND 182 and the RS flip flop 185 becomes "1" and stays at a "high" and in turn NAND 184 becomes "0" until the first step of counter J is actuated. Therefore, if before step 1 is actuated, the stop signal occurs, the output of NAND 180 toggles to "0" and energizes the "TOO SOON" relay CR11 to close its CR11-1 and CR11-2 contacts. Red lamp 231 lights and an audible alarm (not shown) sounds. A high signal is also applied to stop counter NAND 188 such that the latter emits a low signal for imposition of the input of start count NAND 152 to cut off the counter J. NAND 190 operating off of the same input lines that go to NAND 188 feeds inverters 156 and 158 to insure that the lights remain on even though the injection cycle repeats. NAND 192 feeds the lower input of NAND 194 which functions to energize reset CR 12 through NAND 195. The reset relay CR 12 causes green light 232 to light by way of contacts 12 CR-1 and in addition closes 12 CR-2. The purpose of the latter's closing is to insure that there will be some resistance retained in the R-C timer circuit (the same as midpoint) whereby the operator can run the machine manually.

Inverters 196 and 198 in the "too late" circuit perform the same function as the NAND 190 in the "Too soon" circuit — to keep on the lights even though the machine counter J is rendered inoperative. NAND 198 is incorporated in the "too late" circuit functions to lock out the "too soon" relay CR-11 and hence the "too soon" lamp 231. That is, since the decade counter J would be cut out if a "too late" signal were received, on the very next cycle we would otherwise encounter the lighting of both red lamp 231 as well as the lamp 230.

Manual reset of all solid state circuit components is effected by means of reset buttons which reverses RS flip flop 200. The output of the lower NAND in RS flip flop 200 operates to reset the counter J via inverter 212 and the digital read-out L by way of inverter 213 and NAND 215. It is also to be noted that the start-stop flip flop 102–104 is also placed in a predetermined disposition by way of inverter 216 whereas inverter 219 is incoroporated for clearing the "too soon" circuit. Automatic reset of the CR 12 relay is accomplished by way of the upper NAND of RS flip flop 218.

The digital read-out L constitutes a decade divider counter similar in principle to the divider decades 116, 118 and 120 wherein the counting input of each succeeding decade is tied to the 8 output of the preceding stage. However, in the read-out counter, the output of the modules and their bits are used to drive a Nixie display indicator in a conventional manner. The count signals from the divider 114 are fed into the digital read-out L through a pair of series arranged inverters until the stop position switch LS1 discontinues the 1,000 pulse per second oscillation. The duration of the measured course will thereby be read directly. Automatic reset will be instituted on the start signal.

Figure 5:
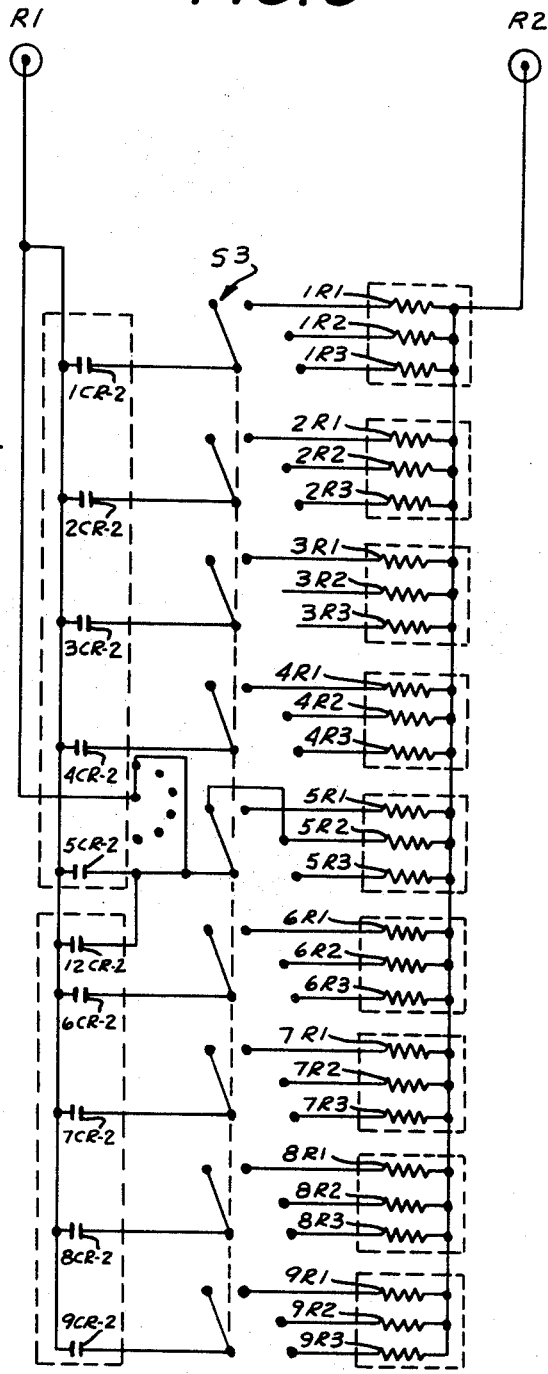
FIG. 5 is an across-the-line schematic diagram for varying the slope angle time correction for different viscosity index materials.

Referring now to FIG. 5, each of the CR-2 contacts tripped by the corresponding relay is in series with a bank of resistors by way of rotary switch S3. Each of these resistors is adapted to be incorporated within the circuit of the R-C Timer T depending upon the position of the rotary switch S3 and which CR-2 contacts are energized whereby the duration of the high pressure level may be varied from that initially set. The position of the rotary switch 3 determines the slope of the correction, position No. 1 being the lowest slope angle (lowest resistance in each bank) to effect the least amount of incremental time variation in the high-low pressure timer T with position No. 4 being the greatest slope angle (highest resistance in each bank) to produce the greatest increment of time variation for a given step indication. The resistances increase with the higher the step indications.

The following is a representation of approximate resistance values to effect the degree of time correction:

|  | Slope 1 | | | Slope 2 | | | Slope 3 | | |
|---|---|---|---|---|---|---|---|---|---|
| Step | Resistor | 1,000 ohms | Time, Δ secs. | Resistor | 1,000 ohms | Time, Δ secs. | Resistor | 1,000 ohms | Time, Δ secs. |
| Too fast |  |  |  |  |  |  |  |  |  |
| 1 | 1R1 | 126K | −.08 | 1R2 | 102K | −.16 | 1R3 | 78K | −.24 |
| 2 | 2R1 | 132K | −.06 | 2R2 | 114K | −.12 | 2R3 | 96K | −.18 |
| 3 | 3R1 | 138K | −.04 | 3R2 | 126K | −.08 | 3R3 | 114K | −.12 |
| 4 | 4R1 | 144K | −.02 | 4R2 | 138K | −.04 | 4R3 | 132K | −.06 |
| Mid-5 | 5R1 | 150K | Zero | 5R2 | 150K | Zero | 5R3 | 150K | Zero |
| 6 | 6R1 | 156K | +.02 | 6R2 | 162K | +.04 | 6R3 | 168K | +.06 |
| 7 | 7R1 | 162K | +.04 | 7R2 | 174K | +.08 | 7R3 | 186K | +.12 |
| 8 | 8R1 | 168K | +.06 | 8R2 | 186K | +.12 | 8R3 | 204K | +.18 |
| 9 | 9R1 | 174K | +.08 | 9R2 | 198K | +.16 | 9R3 | 222K | +.24 |
| Too slow |  |  |  |  |  |  |  |  |  |

Depending upon which of the above resistors have been incorporated into the circuit as a result of actuation of the relay contacts will determine the amount of time which will be established on the R-C high-low pressure timer T, that is, the timer comprises a resistance-capacitance clock defined by a solid state time delay logic module with a digital set point, such as module No. 2369-2 made by Solid Controls Inc. of Minneapolis, Minn. Basically, an input signal to the module will initiate a preselected delay period which is determined by the charging up of a condenser system. Without going into detail, the digital setpoints 250 of the timer T allow resistance to be dialed into the resistance-capacitance bridge, each 0.01 (one hundredths) second being represented by approximately 3,000 ohms. In addition to the variable resistance dialed in by the digital set points, incorporation of one of the relay actuated resistances 1R1 - 1R3 to 9R1 9R3, is accomplished by way of the process control system hereinbefore described. It is to be observed that the 5CR1, 5CR2, or 5CR3 resistances (all the same are included in the R-C timer T circuit during the setup condition since these resistance values represent the midpoint. This time value is 0.50 second.

Figure 6:
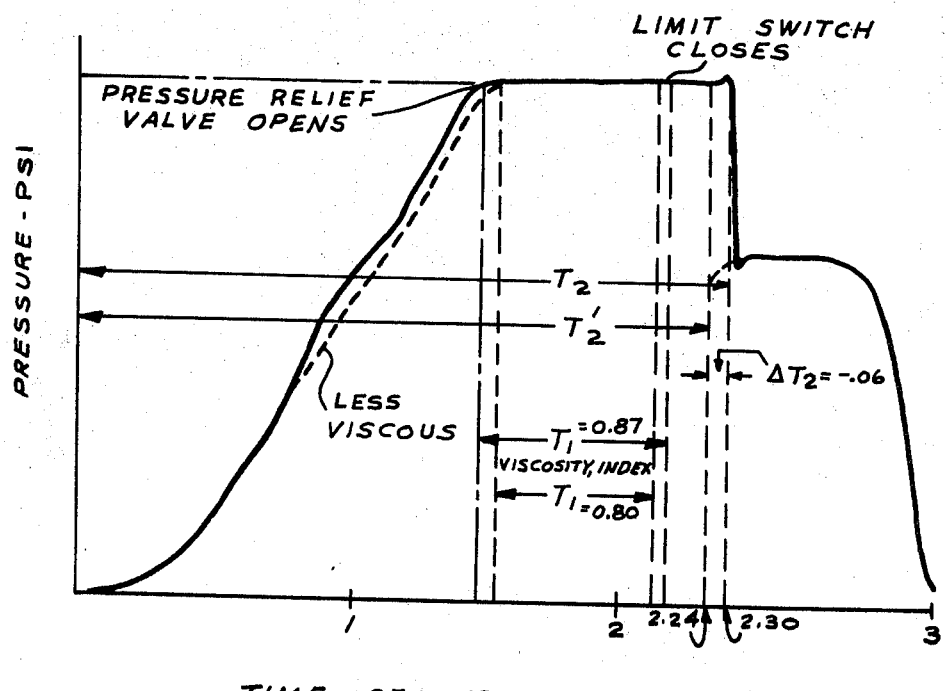
FIG. 6 is a graph demonstrating a typical pressure versus time curve for a representative cycle and empirically determined compensation corrections.
Figure 3:
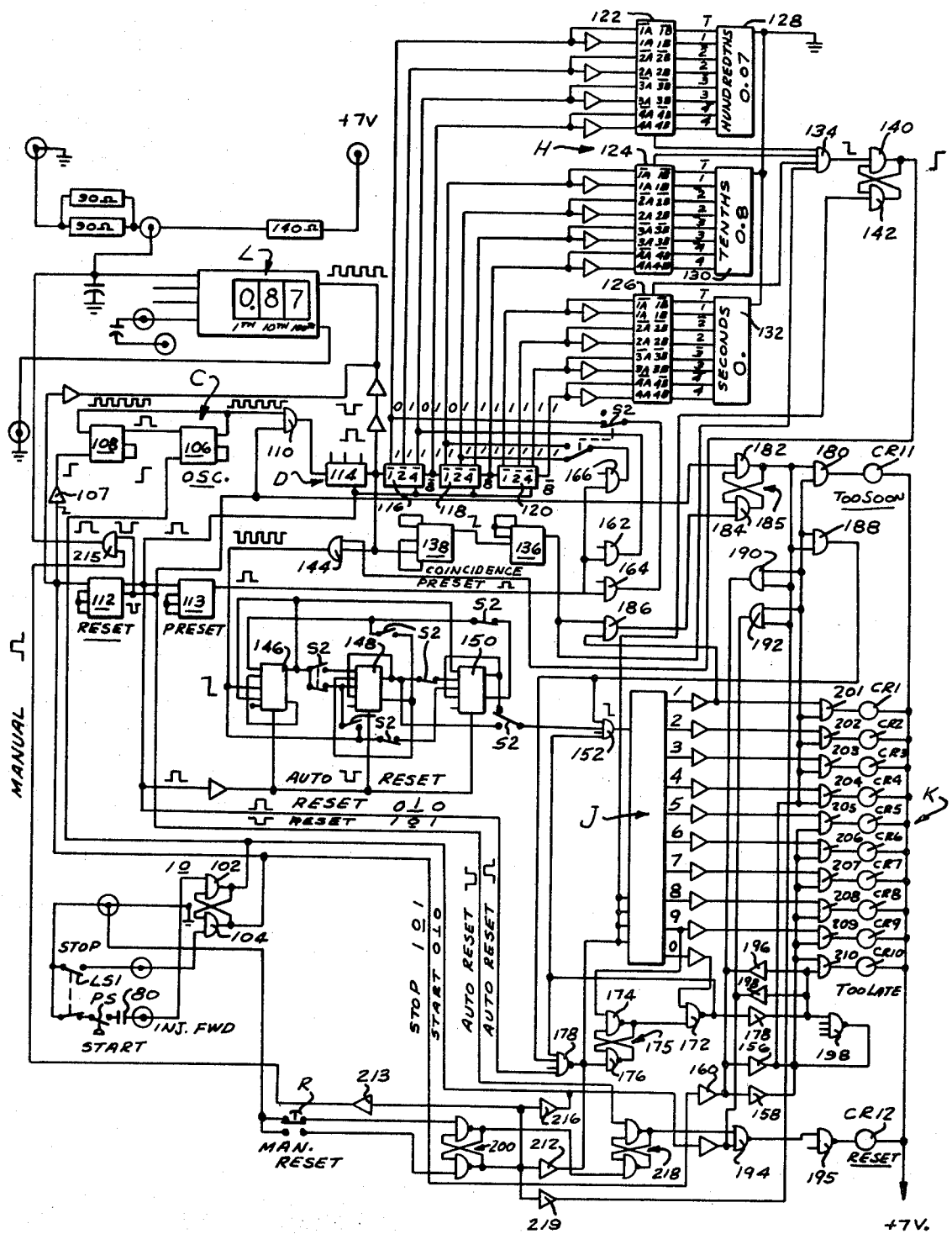
FIG. 3 is an electrical schematic diagram of the digital control circuitry.

Referring now to FIG. 6, the operator during set up of the injection molding machine would run a particular thermoplastic composition by arranging his temperature controls and the time on the high-low pressure timer T to produce a good part. All of this would be done in a conventional manner, the timer T being set such that the duration of the high pressure portion of the injection stroke minus the maximum time increment which could be added by the process control resistances at step 9 would not flash the mold. For example, the time dialed in on the set points 250 from the beginning of the injection stroke may be 2.30 seconds. This is shown as T2 on the FIG. 6 graph. Next, the limit switch LS1 is so located that there will be sufficient time which can be subtracted from the highlow timer T set point to correct in the maximum slope position of rotary switch S3. The operator then turns on the process controller and measures the time between closing of the pressure switch PS (pressure relief valve 70 opens) and the tripping of limit switch LS1. This value is determined by the reading on the digital readout L. After the readout value has been measured several times with good parts being produced, the operator sets the average of this reading on the digital set point dials 128, 130 and 132. This value is known as the viscosity index, and as shown in FIG. 3, is 0.87 seconds on the readout L and on the digital set point dial. This value is also shown as $T_1$ on the FIG. 6 graph.

The operator now selects the increments of timer $T_2$ for which the controller is to correct by setting the slope switch S3 to Δ $T_2$ to 0.02, 0.04 or 0.06. Only three slopes have been illustrated, but of course any practical number of slopes could be selected. At this stage, the controller would be on line. The controller would now monitor the time interval between the opening of the relief valve 70 and the closing of limit switch LS1 on each shot and compare the interval with the viscosity index set point value 0.87 seconds. Depending upon how many steps away from the set point the monitored time $T_1$ was, would determine the degree of correction to be made in the high pressure time on the high-low Timer. The count switch S2 is a sensitivity selector which determines the permissible variation in Δ T, for each step. Of course, the 3 count is the most sensitive in that there is a 0.03 second interval in each step whereas the 5 count position includes a 0.05 second interval. The 5 count position expands the range to 0.25 seconds on each side of the zero midpoint before the alarm is sounded.

Assuming that the operator has used a digital set point of 0.87 seconds on dials 128, 130, 132, a sensitivity of 3 count, a set point on the high-low pressure timer T as 2.30 seconds, and a slope or deviation on switch S3 of 0.02 seconds. If the measured interval $T_1$ were 0.80, this would indicate that the shot being injected is thinner than the prescribed 0.87 viscosity index by 0.07 second. That is, because the shot was less viscous than the control viscosity, the pressure relief valve 70 would open later in time and the limit switch LS1 would close earlier in time since there would be less resistance to flow. The step 3 relay CR3 (−0.07 to −0.05 second) would be actuated (three steps before the midpoint step 5) thereby lighting lamp 223, energizing 3CR-2 contacts and bringing resistance 3R1 into the R-C timer circuit. Accordingly, (0.04 second) would be subtracted from the 2.30 (time originally set so that only 2.26 seconds of high pressure time would be imposed during that less viscous shot.

By way of another example, if the set point viscosity index were again set at 0.87, the count selector switch S2 at 3 count, and the high-low pressure timer at 2.30, but the slope or deviation switch 3 at "3," the degree of correction would be ±0.06 second in time $T_2$ for each step away from the midpoint. Thus, should the monitored time of the shot being injected indicate $T_1'' = 1.00$ second, step 9 relay CR9 would be actuated indicating that the shot was too viscous and at the top of the range of correction on 3 count position. Lamp 229 would light and contacts 9CR-2 would close to bring in the 9R3 resistance. Thus, $\Delta T_2'' = 0.24$ second would be added to the R-C timer T at the end of that shot to push more material into the mold in compensation of the increased resistance of the greater viscosity.

In the event that the shot being injected were too thin and less than step 1 range or too viscous and beyond the step 9 range, relays 10CR and 11CR would be correspondingly actuated to light lamp 230 or 231, respectively, to sound an alarm.

Still another variation contemplated by the instant invention is the starting of the high-low pressure timer T run at the end of the monitored course, i.e. — when the limit switch LS1 closes — instead of beginning high pressure time at the inception of the injection stroke. In this manner, high pressure would be imposed during the injection stroke up to and including the closing of the limit switch S1. At that stage, the extension of high pressure time by way of $\Delta T_2$ would be added or subtracted in the manner of a vernier depending upon whether $\Delta T_1$ were plus or minus respectively.

Both of the foregoing embodiments contemplate the monitored run at constant pressure wherein the flow into the mold is directly related to the viscosity. As still another modification, it is possible to measure the interval of the injection stroke from the beginning of injection until the opening of the relief valve or the closing of the limit switch, and depending upon whether the interval were longer or shorter, correspondingly subtracting or adding time to the high pressure timer T.

Also contemplated within the scope of the foregoing invention is that the primary pressure may be imposed at a lower level than the secondary pressure such that during the initial portion of the stroke the injection pressure will be less than that imposed during the latter portion of the stroke. It is also within the contemplation of the present system to use a primary pressure level of some finite value which is reduced to zero at the end of the primary time period.

Although this invention has been described in considerable detail, such description is intended as being illustrative rather than limiting since the invention may be variously embodied, and the scope of the invention is to be determined as claimed.

What is claimed is:

1. Automatic control apparatus for an injection molding machine having a reciprocable ram for injecting plasticized material from an extrusion cylinder into a mold comprising:
   means for advancing the ram under hydraulic pressure to inject a prepared shot of plasticized material into the mold, including a hydraulic system, means for applying a hydraulic pressure upon the ram during the initial portion of the injection stroke until the pressure reaches a predetermined value, including means to maintain a constant primary pressure level at said predetermined value, means for changing the hydraulic pressure to a secondary pressure level during the terminal portion of the stroke, and a timer for actuating the means for changing the hydraulic pressure to the secondary level after lapse of a selected time period,
   sensing means for time monitoring a predetermined portion of the ram injection stroke prior to complete filling of the mold, including comparator means for measuring the degree of variation when the monitored interval falls outside predetermined limits determined to produce satisfactory molded parts, and,
   compensation means responsive to said comparator means automatically varying the time period of said timer to modify the duration of the primary pressure level in the same shot being injected corresponding to the degree of variation from the prescribed limits during the monitored interval.

2. The automatic control apparatus of claim 1 wherein said primary pressure is at a higher level than said secondary pressure level, and said means for changing constitutes a means for reducing the hydraulic pressure to the lower secondary pressure level.

3. The automatic control apparatus of claim 1 including pressure relief means in the hydraulic system actuated at a predetermined pressure level during ram advancement and operative when actuated to maintain said means for applying hydraulic pressure at a substantially constant level, and said sensing means monitors the time interval between the actuation of said pressure relief means and a predetermined position of the ram prior to filling of the mold.

4. The automatic control apparatus of claim 3 wherein the position of the ram at actuation of the pressure relief means is determined by the tripping of a pressure switch and the position of the ram at the end of the monitored interval is determined by a limit switch.

5. The automatic control apparatus of claim 3 wherein said comparator means includes a plurality of step counting means for determining in increments the relative degree to which the apparent viscosity of the shot being injected is respectively less and greater than the prescribed limits when the measured interval is correspondingly less and greater than a selected band, and said compensating means includes a step correction means actuated by a corresponding one of said step counting means for respectively subtracting and adding corresponding decrements and increments of time to said timing means.

6. The automatic control apparatus of claim 5 wherein said timer constitutes an electronic resistance - capacitance time delay circuit.

7. The automatic control apparatus of claim 5 wherein said step counting means are adjustable for varying sensitivity of measured interval.

8. The automatic control apparatus of claim 5 wherein said step counting means includes means for signaling an alarm when the viscosity of the shot being injected is beyond the capability of the compensating means.

9. The automatic control apparatus of claim 5 wherein said step correction means are each adjustable for varying the incremental degree of correction in time which is applied to said timing means as a result of actuation of any step counting means.

10. The automatic control apparatus of claim 4 wherein said timer begins to time at the start of the injection stroke.

11. The automatic control apparatus of claim 4 wherein said timer begins to time at the end of the monitored interval.

* * * * *